(12) United States Patent
Heng et al.

(10) Patent No.: US 8,635,021 B2
(45) Date of Patent: Jan. 21, 2014

(54) INDICATORS FOR OFF-SCREEN CONTENT (75) Inventors: Keekim J. Heng, Zurich (CH); Scott M. Lederer, Brooklyn, NY (US); Ethan Russell, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/464,770

(22) Filed: May 4, 2012

(65) Prior Publication Data
US 2013/0297206 A1 Nov. 7, 2013

(51) Int. Cl.
*G01C 21/00* (2006.01)

(52) U.S. Cl.
USPC ....... 701/459; 701/425; 701/432; 340/995.27

(58) Field of Classification Search
USPC ......... 701/425, 426, 432, 446, 208, 409, 411, 701/450, 454, 457, 459, 532, 428, 431, 701/460; 340/995.1, 995.11, 995.14, 340/995.17, 995.26, 995.27, 995.28; 348/113, 115, 116, 117, 118
See application file for complete search history.

(56) References Cited

U.S. PATENT DOCUMENTS

| | | | |
|---|---|---|---|
| 5,930,474 A | 7/1999 | Dunworth et al. | |
| 6,321,158 B1 * | 11/2001 | DeLorme et al. | 701/426 |
| 6,954,696 B2 * | 10/2005 | Ihara et al. | 701/455 |
| 7,913,192 B2 * | 3/2011 | Dicke et al. | 715/864 |
| 7,991,546 B2 * | 8/2011 | Iao | 701/426 |
| 2007/0176796 A1 * | 8/2007 | Bliss et al. | 340/995.14 |
| 2009/0169060 A1 * | 7/2009 | Faenger et al. | 382/113 |
| 2010/0201707 A1 | 8/2010 | Rasmussen et al. | |
| 2011/0077848 A1 * | 3/2011 | Xiao et al. | 701/200 |
| 2013/0076784 A1 * | 3/2013 | Maurer et al. | 345/629 |

OTHER PUBLICATIONS

International Search Report and Written Opinion for PCT App. No. PCT/US13/38372, mailed on Jun. 17, 2013. (pp. 1-6).

* cited by examiner

*Primary Examiner* — Mary Cheung
*Assistant Examiner* — Rodney Butler
(74) *Attorney, Agent, or Firm* — Bracewell & Giuliani LLP (57) ABSTRACT

Methods, systems, and apparatus, including computer programs encoded on a computer storage medium, for displaying an indication of off-screen content. In one aspect, a method includes the actions of providing an electronic map of a first geographic area that includes a first entity at a first geographic location for display on a user interface and receiving user input indicating an interest in a second entity at a second geographic location that is outside of the first geographic area. An electronic map of a second geographic area that includes the second geographic location of the second entity is provided, and a first indicator, indicating at least an approximate direction to the first geographic location, is provided for display on the electronic map of the second geographic area.

23 Claims, 6 Drawing Sheets

INDICATORS FOR OFF-SCREEN CONTENT

BACKGROUND

This specification relates to presentation of information about geographic entities on electronic maps.

Online mapping utilities provide a convenient resource to view maps of selected geographic areas and to navigate to different levels of detail (e.g., by zooming in or out) and to different geographic areas (e.g., by panning). In some cases, users can select types of features (e.g., terrain, labels, traffic) that are shown on the map. In addition, users may be able to place markers (e.g., waypoints) on a map, draw lines (e.g., routes) on the map, or associate photos or other information with a location on a map. Online map search tools allow users to search for a location or a business and display a map of an area around the location or business. In some cases, a map displayed in response to a search request includes a pin or other marker that shows a location of the location or business that is responsive to the search request. Various map tools also provide mechanisms for overlaying routes (e.g., from a user-selected origination location to a user-selected destination location) or other graphical information on a map.

SUMMARY

This specification describes technologies relating to displaying indicators for off-screen content.

In general, one innovative aspect of the subject matter described in this specification can be embodied in methods that include the actions of providing an electronic map of a first geographic area that includes a first entity at a first geographic location for display on a user interface; receiving user input indicating an interest in a second entity at a second geographic location that is outside of the first geographic area; providing an electronic map of a second geographic area that includes the second geographic location of the second entity; and providing a first indicator, corresponding to the first geographic location, for display on the electronic map of the second geographic area, wherein the first indicator indicates at least an approximate direction to the first geographic location. Other embodiments of this aspect include corresponding systems, apparatus, and computer programs, configured to perform the actions of the methods, encoded on computer storage devices.

These and other embodiments can each optionally include one or more of the following features. The first indicator includes at least one of a distance to the first geographic location or an estimated time to travel to the first geographic location. A characteristic of the first indicator depends on a distance to the first geographic location. In response to a user selection of the first indicator, information associated with the first entity or the first geographic location is provided. The first entity is identified in response to a first search query. In response to a user selection of the first indicator, the first geographic area is provided for display on the user interface. A second indicator representing the second entity or the second geographic location is generated, and the second indicator is displayed in the map displaying the first geographic area. The user input includes a search query and the second entity is identified as being responsive to the search query. A second indicator, corresponding to the second entity, is provided for display on the electronic map of the second geographic area to indicate an approximate location of the second entity in the second geographic area. The electronic map is displayed in a window of a web browser.

In general, another aspect of the subject matter described in this specification can be embodied in methods that include the actions of providing a first electronic map of a first geographic area to be displayed on a user interface, wherein the first geographic area includes a first entity at a first geographic location; receiving an identification of a second geographic location situated outside of the first geographic area; providing a second electronic map of a second geographic area to be displayed on the user interface, wherein the second geographic area includes the second geographic location; and generating data defining a first indicator for display with the second electronic map on the user interface, wherein the first indicator indicates at least an approximate direction to the first geographic area from the second geographic area. Other embodiments of this aspect include corresponding systems, apparatus, and computer programs, configured to perform the actions of the methods, encoded on computer storage devices.

These and other embodiments can each optionally include one or more of the following features. The identification of the second geographic location is generated in response to a search query for an entity located at the second geographic location. The first electronic map is generated in response to a search query for a place located in the first geographic area. The first electronic map is generated in response to a request to pan to the first geographic area from a different geographic area. The first indicator includes at least one of a distance to the geographic location or an estimated time to travel to the geographic location. The methods further include the actions of receiving an identification of a third geographic location situated outside of the first and second geographic areas; providing a third electronic map of a third geographic area to be displayed on the user interface, wherein the third geographic area includes the second geographic location; generating data defining a second indicator for display with the third electronic map on the user interface, wherein the second indicator indicates at least an approximate direction to the first geographic area from the third geographic area; and generating data defining a third indicator for display with the third electronic map on the user interface, wherein the third indicator indicates at least an approximate direction, from the third geographic area, to the second geographic area. Generating data defining a first indicator for display with the electronic map on the user interface includes receiving coordinates for a location within the first geographic area; receiving coordinates for a location within the second geographic area; and calculating an angle between the coordinates for the location within the first geographic area and the coordinates for the location within the second geographic area. Generating data defining a first indicator for display with the second electronic map on the user interface includes providing a script executable on a client device that displays the user interface, wherein the script calculates an angle between coordinates for a location within the first geographic area and coordinates for a location within the second geographic area. The script is adapted to dynamically calculate the angle based on at least one of a current orientation of the electronic map or panning of the electronic map.

In general, another aspect of the subject matter described in this specification can be embodied in a system that includes one or more computers operable to interact with a user device in order to: generate an electronic map of a first geographic area in response to first user input on the user device, the first geographic area including a first geographic location of a first entity; provide the electronic map of the first geographic area to the user device; generate an electronic map of a second geographic area in response to second user input on the user device received after providing the electronic map of the first geographic area; generate data defining an indicator for display on the electronic map of the second geographic area, wherein the indicator corresponds to the first geographic location and indicates at least an approximate direction to the first geographic location; and provide the electronic map of the second geographic area and the data defining the indicator to the user device.

These and other embodiments can each optionally include one or more of the following features. The data defining the indicator defines an appearance of a graphical component including a pointer in the direction to the first geographic location. The data defining the indicator defines instructions executable on the user device to calculate the direction based on at least one of a currently displayed geographic area or a current orientation of the electronic map. The one or more computers include a server operable to interact with the device through a data communication network, and the device is operable to interact with the server as a client.

Particular embodiments of the subject matter described in this specification can be implemented so as to realize one or more of the following advantages. The use of indicators of off-screen content can help to orient the user with respect to the currently displayed map and a previously searched-for location or business. The orientation, for example, can communicate both direction and distance to the previously searched-for location or business. The use of indicators of off-screen content can also help the user to disambiguate and identify a specific result when searching for places. For example, when a user initiates a search, indicators of off-screen content can be used on a currently displayed map to identify two or more potential results (e.g., where the desired search results are potentially ambiguous), and the user can select a desired result based, at least in part, on the indicators of off-screen content. Further, the use of indicators of off-screen content can help the user to see the geographical relationship between two or more locations or businesses that may be outside the currently-displayed map and/or between the currently displayed geographical area and one or more locations or businesses that are outside the currently-displayed map.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In web browsers, map applications, and other computer or online applications, electronic maps can be used to view the geographic locations of entities and/or places associated with content. For example, electronic maps can display the locations corresponding to businesses, addresses, attractions, neighborhoods, campuses, towns, countries or other geographic locations associated with entities identified in search results. Electronic maps can also display areas that include entities associated with starting points, destinations, or driving directions in map applications. In some cases, the entities are included in the geographic area for the currently-displayed map. However, in other cases, the entities or places are in locations that are outside the geographic area of the current map. When locations are outside the currently displayed geographic area, it can be advantageous to display indicators on the map that provide some information regarding the entities or places that are not within the map, but in which the user may be interested.

Figure 1:
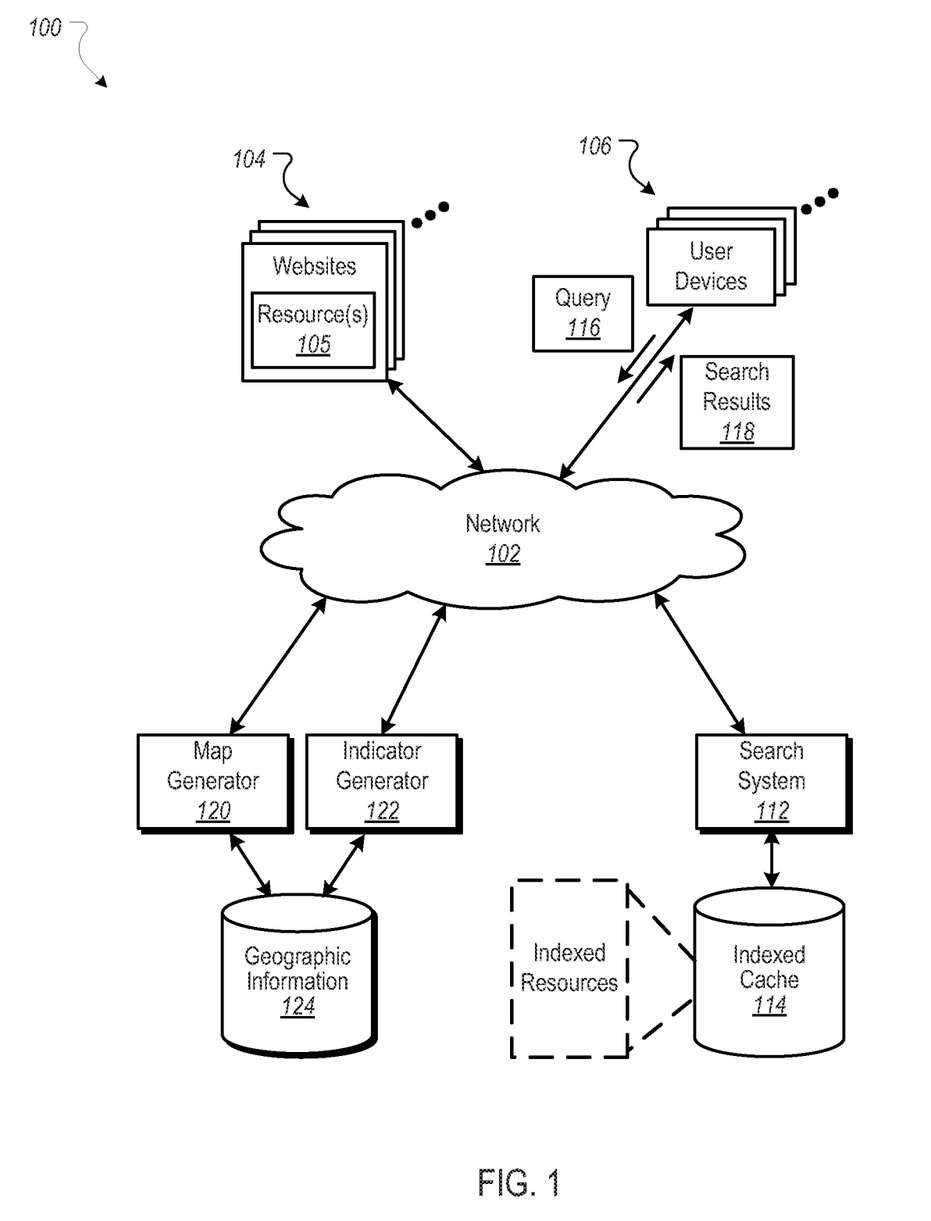
FIG. 1 is a block diagram of an example environment for providing electronic map content.

FIG. 1 is a block diagram of an example environment 100 for providing electronic map content. The environment 100 includes a search system 112 for selecting and providing content in response to a request for content. For example, the request for content can be in the form of a search query 116 submitted by a user of a user device 106. In response to the search query 116, the search system 112 can provide search results 118 to the user device 106.

The environment 100 includes a network 102, such as a local area network (LAN), a wide area network (WAN), the Internet, or a combination thereof. The network 102 connects the user devices 106, the search system 112, websites 104, advertisers, and publishers. The environment 100 can include many thousands of user devices 106, websites 104, advertisers and publishers.

The environment 100 further includes a map generator 120 and an indicator generator 122, which are also connected to the network 102. The map generator 120 can generate a map in situations where the request for content is location-based, e.g., when the request for content or the responsive content is displayable in a map application's viewport. For example, when the search system 112 receives a search query 116 that results in location-based search results 118, location information related to those search results 118 can be provided to the map generator 120 which can generate a map. In some implementations, the search system 112 can send map identification data to the user device 106, which can then use scripts or other ways to request the actual map (e.g., an electronically rendered image of a geographic area or data from which an image of a geographic area can be rendered by the user device or another device) from the map generator 120. In some implementations, the location-based search results 118 can identify the geographic scope (e.g., as boundaries of a geographic area to be mapped) based, for example, on the geographic scope of one or more entities identified in the search results. Example entities include businesses, addresses, attractions, neighborhoods, campuses, towns, countries or other geographic location. The entity and/or its location can cover a small geographic area (e.g., a restaurant, store or single residence) or a larger geographic area (e.g., a city, state or country). Using the received map identification data, the geographic scope, and/or some other input, the map generator 120 can provide the corresponding map(s) to the user device 106. Example maps can include any type of electronic maps such as a road map view, a satellite view, a terrain view, etc. Maps can also be hybrids, containing aspects of different types of views (e.g., a hybrid road-and-satellite view).

The indicator generator 122 can generate indicators for entities associated with the map generated by the map generator 120. For example, the map, when it is initially displayed on the user device 106, can be provided at a resolution and using a center-point that allows only a subset of the entities to be displayed. In this situation, entities that are not currently displayed (e.g., within the map application's viewport) can be represented by displaying indicators of off-screen content. The indicators that the indicator generator 122 generates can include all of the entities associated with the map whether or not they are initially displayed. In this way, no matter how the user interacts with the map, such as by panning, zooming, etc., entities that are not contained in the current viewport can be represented using indicators of off-screen content. The indicators generated by the indicator generator 122 can include a displayable portion as well as a non-displayable portion (e.g., map coordinates, etc.) that together are used to display indicators when needed and at any map resolution or center-point location. An indicator can include an arrow that points in the direction of the corresponding entity relative to the currently displayed map. An indicator can include textual information, e.g., the name of the entity, a distance (e.g., in miles, kilometers, etc.) to the entity, a travel time (e.g., to walk, drive, bicycle, etc.) to the entity, and/or any other information.

The map generator 120 and indicator generator 122 can use a data store of geographic information 124. For example, the map generator 120 can use map identification data to access one or more maps from the geographic information 124. In another example, the map generator 120 can use the geographic scope of a region to access or generate a map using information in the geographic information 124. The indicator generator 122 can use the geographic information 124 to generate indicators, including information that determines the location of the indicators on the map, and/or the direction in which indicators for off-map entities point. In one example, the generated information can cause an indicator for an entity that is located to the southeast of a currently displayed map to be displayed on the right edge of the map and to point to the southeast. As an alternative, the indicator generator 122 can provide information and/or scripts from which indicators can be dynamically generated by a user device on a map displayed on the user device (e.g., based on a currently displayed geographic area and a location of an entity represented by the indicator).

In a detailed example, the search system 112 can receive a search query 116 that includes user input indicating an interest in an entity having a corresponding geographic location. For example, the search query 116 can be a search query for a particular business or type of business in Vermont, or a search query related to the geographic location Vermont in general (e.g., if "Vermont" is one of the query terms of the search query 116), and so on.

In response to the search query 116 or prior to receiving the search query 116, the search system 112 and the map generator 120 can collectively provide an electronic map of a first geographic area for display on a user interface. The geographic location associated with the search query, however, can be situated outside of the first geographic area. For example, the user interface can be provided by a map application running on the user device 106, and the geographic area displayed by the map application can be an area that includes the user's current location (e.g., Portland, Oreg.). The geographic location of the search result (e.g., a particular business in Vermont) can be outside the first geographic area, e.g., off the map that includes the user's current location (e.g., Portland, Oreg.). As a result, the map displayed by the map application can include or can be updated to include an indicator of the geographic location of the search result.

Figure 2:
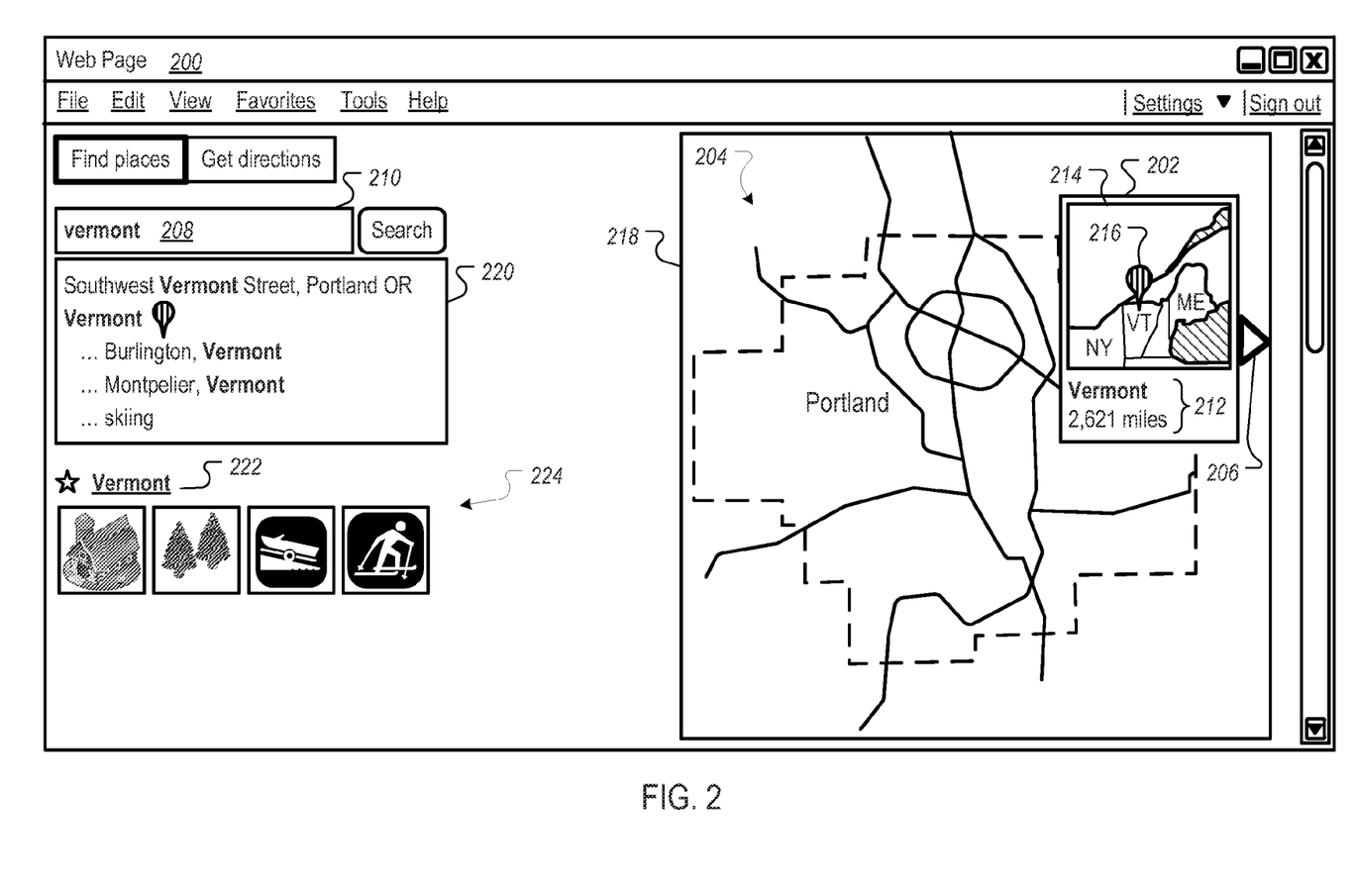
FIG. 2 is a screenshot of an example user interface that includes an indicator of off-screen content.

The indicator generator 122, for example, can provide a first indicator that corresponds to the geographic location of the search result. The first indicator can be provided as part of the electronic map, or in addition to (e.g., as an overlay on) the electronic map. The first indicator can indicate at least an approximate direction to the geographic location of the search result using a pointer (e.g., an arrow or directional indicator) or based on a location of the first indicator in the display. For example, the first indicator can be located at or near an edge of the first geographical area that is between a center point of the first geographic area and the geographic location of the search result. For example, the first indicator can be positioned along an imaginary straight line that connects the center-point of the first geographic area (e.g., Portland) to the center point of the geographic location of the search result (e.g., the particular business in Vermont or, in some cases, the center of Vermont) as shown in FIG. 2.

In some implementations, the indicator generator 122 can use map- and math-related functions (e.g., included with the geographic information 124) to determine suitable positions for the indicators as well as to determine new positions for the indicators if the map is panned and/or zoomed. In some implementations, an indicator generated by the indicator generator 122 can include information (e.g., a website name, URL, etc.) about a website or resource associated with the geographic location referred to by the indicator.

The map generator 120 and indicator generator 122 can be used in the context of an overall environment 100 that facilitates accessing of websites 104 by user devices 106 over a network 102. A website 104 includes one or more resources 105 associated with a domain name and hosted by one or more servers. An example website is a collection of web pages formatted in hypertext markup language (HTML) that can contain text, images, multimedia content and programming elements, such as scripts. Each website 104 can be maintained by a content publisher, which can be the entity that controls, manages, and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, including maps, words, phrases, images, and sounds, that can include embedded information (e.g., meta-information in hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices (e.g., smartphones), and other devices that can send and/or receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. In some cases, the resource 105 itself can include an electronic map, while in other cases an electronic map can be presented as a portion of the resource or user display (e.g., a map of an entity location along with textual or other information about the entity).

To facilitate searching of these resources, the search system 112 can identify the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies at least one resource that is responsive to a particular search query, and includes a link to the resource. An example search result 118 can include a web page title, a snippet of text or a portion of an image extracted from the web page, and the URL of the web page. Search results pages can also include one or more slots in which other content (e.g., maps, ads, or other information) can be presented. The search result 118 can also include geographic data from which a map of a geographic location (e.g., for an entity corresponding to the search result 118) can be generated by the map generator 120, and/or an indicator (i.e., for an electronic map displayed on the user device 106) corresponding to the geographic location (e.g., as generated by the indicator generator 122).

When a resource 105 or search results 118 are requested by a user device 106, the search system 112 can, in some cases, provide additional content with the resource 105 or search results 118. The additional content can include characteristics of slots that are defined for the requested resource or search results page. For example, a reference (e.g., URL) to a resource for inclusion in the slot and a size of the slot can be identified by the search system 112.

FIG. 2 is a screenshot of an example user interface 200 that includes an indicator 202 of off-screen content. The indicator 202 is included on an electronic map 204, e.g., that displays the geographic area around a user's current location in Portland, Oreg. In this example, the indicator 202 is displayed at the far right side of the electronic map 204 and indicates the approximate direction to a geographic location (e.g., Vermont) using an arrow 206. The geographic location of Vermont, depicted by indicator 202, is displayed in response to a search query 208 of "Vermont" that the user has entered in a search field 210. The indicator 202 appears on the map 204 because the map 204 is sized or located such that the geographic region indicated by the indicator 202 is off the map 204. Although the indicator is shown as including a map, a name of the off-screen entity, and a distance to the entity, some or all of this additional information is not displayed in some implementations. For example, in some implementations, the indicator may simply include a pointer (e.g., color coded to correspond to a name of, or a marker for, the entity shown in another part of the user interface, such as at 220), or alternatively a small callout with an entity name and/or a distance to the entity.

While the shape of the map 204 and the geographic area that it displays is rectangular, other shapes can be used including any kind of polygon (e.g., a rectangle, a rectangle with one or more cutouts, or other polygon). A cutout in a map can be used, for example, to accommodate other information or content.

Other example ways that the user can input or identify an interest in an entity include, for example, specification of a starting or ending point in a map application, selection of a search result corresponding to an entity, and so on. The entity in which the user is interested can be anything that has a physical location, including a business, an address, an attraction, a neighborhood, a campus, a town, a country, or other geographic location. The geographic location can cover a small geographic area (e.g., a single residence) or a larger geographic area (e.g., a city or state).

As illustrated in FIG. 2, the indicator 202 includes a distance 212 to the geographic location (e.g., "2,621 miles" to Vermont). The distance can be an approximate distance from the indicator to the geographic location (e.g., an edge or center of the geographic location). In some implementations, user controls can provide the option to change the display to kilometers or other units of measure for length. Other information that the indicator 202 can display includes an estimated time to travel to the geographic location identified by the indicator 202. For example, instead of, or in addition to, the distance 212, the indicator 202 can display a travel time (e.g., in days, hours, minutes, etc.) and the travel means (e.g., walking, driving, or using public transportation, e.g., according to a currently-selected transportation type option). In some implementations, multiple travel times and corresponding travel means can be displayed.

In some implementations, the indicator 202 can include a reference map 214. For example, if Vermont is the geographic location, then the reference map 214 can include a map of New England that includes a push-pin 216 in the state outline of Vermont. The push-pin 216 or some other marker (e.g., a circle, rectangle, etc.) can serve as a second indicator that corresponds to the geographic location of the search result (e.g., Vermont), indicating an approximate location of the entity in the second geographic area.

In some implementations, the electronic map 204, including the indicator 202, can be displayed within a viewport 218, e.g., by a map application. In some implementations, the form or appearance of the indicator 202 that is generated can depend on the types of entities represented by the indicator, including whether the entities are sponsored content 222, or area attractions 224. In some implementations, the electronic map 204 can be displayed in a window of a web browser, such as in the viewport 218.

For example, when the electronic map 204 is displayed in a window of a web browser, user input in the browser can include a navigational search query (i.e., a query for a specific entity), or in some cases an exploratory or categorical search query that results in a number of results. In some implementations, the query can be received through a map search interface or a web search interface. The indicator 202 can correspond to one of the entities identified as being responsive to the search query, e.g., as displayed in a drop-down box of suggestions 220. In this example, the indicator 202 can provide a way for the user to disambiguate and identify a specific result when searching for places, e.g., from a group of places related to "Vermont." For example, as the user types "Vermont" for the search query 208, suggested items can automatically appear in the drop-down box 220, and each suggested item can have an indicator such as the indicator 202 to help the user identify a desired search result based on the indicated location.

In some implementations, the electronic map 204 can result from various types of requests, received at various times. For example, the electronic map 204 can initially be displayed in response to a search request for a business entity in Portland, Oreg. A subsequent search request for "Vermont" can result in display of the indicator 202 corresponding to Vermont on top of the electronic map 204 of the Portland area. Alternatively, an initial search request for Vermont can result in initially displaying an electronic map of Vermont (not shown), and a subsequent search for the Portland business entity can result in the display of the electronic map 204 of the Portland area with the indicator 202 corresponding to the initially displayed map of Vermont. In another example, a change in the displayed content of the electronic map 204 can result from a request to pan the map. For example, a user who initially submits a search request for Vermont is initially presented with an electronic map of the Vermont area (not shown). If the user subsequently pans westward across the country, the electronic map 204 of the Portland area can be displayed, together with the indicator 202 of the initially displayed electronic map of Vermont. In particular, the indicator 202 can be presented as soon as or shortly after the user pans away from the map of Vermont. In some implementations, panning can be accomplished using navigation arrows or other controls, or by dragging the electronic map display to the first geographic area.

In some implementations, the electronic map 204 can be displayed before the user enters a search query or otherwise makes a selection in an application that identifies an entity. For example, the electronic map 204 can be displayed to indicate the user's current location as determined from GPS data, wifi data, cellular access data, IP address data, or other means. In this example, the map 204 can be displayed initially without any indicators 202, and one or more indicators 202 can be displayed after the search query is entered or after the user pans the initially displayed map to a location outside of the initially displayed geographic area.

The indicator 202 can be one of several indicators displayed on the map 204. In some implementations, variations can be made in the appearance or some other characteristic(s) of each of the displayed indicators 202 to provide additional information about the entities corresponding to the indicators. For example, the size, color, opacity, shape or other visual characteristic of the indicators 202 can depend on (and provide a visual cue for) a distance between the center of the geographic area displayed in the electronic map 204 and the location of the entity depicted by the indicator 202. In some implementations, the distance can be depicted by the color of the indicator, and can range from blue (depicting entities that are relatively far away) through green, yellow, orange and red (depicting entities that are relatively nearby). Example opacities can range from a somewhat transparent indicator 202 (e.g., depicting an entity that is far away) to solid (e.g., not at all transparent, depicting an entity that is nearby). The size of the arrow 206 or the indicator itself can also indicate the distance to the entity depicted by the indicator 202, e.g., using a larger arrow or indicator to depict nearby entities.

In some implementations, the visual or other characteristic of the indicator 202 can differ depending on whether the entity is identified in response to a current search query or an earlier search query. For example, while the indicator 202 corresponds to the user's current search query for Vermont, other indicators 202 can appear on the map 204, such as if the user recently searched for maple syrup, green mountains, or skiing.

In some implementations, a selection of the indicator 202 by the user (e.g., a mouse-over) can result in displaying information associated with the entity or the geographic location represented by the indicator. For example, if the user moves a cursor over the indicator 202, a popup or other displayed element can appear that provides additional information about the entity or geographic location represented by the indicator, e.g., in addition to (or instead of) the information provided in the indicator 202 when the cursor is not positioned over the indicator. In some implementations, other mechanisms can be provided by which the user can obtain additional information, such as menu selections from a tool bar, "more info" controls on the indicator 202, or right mouse button options.

Figure 3:
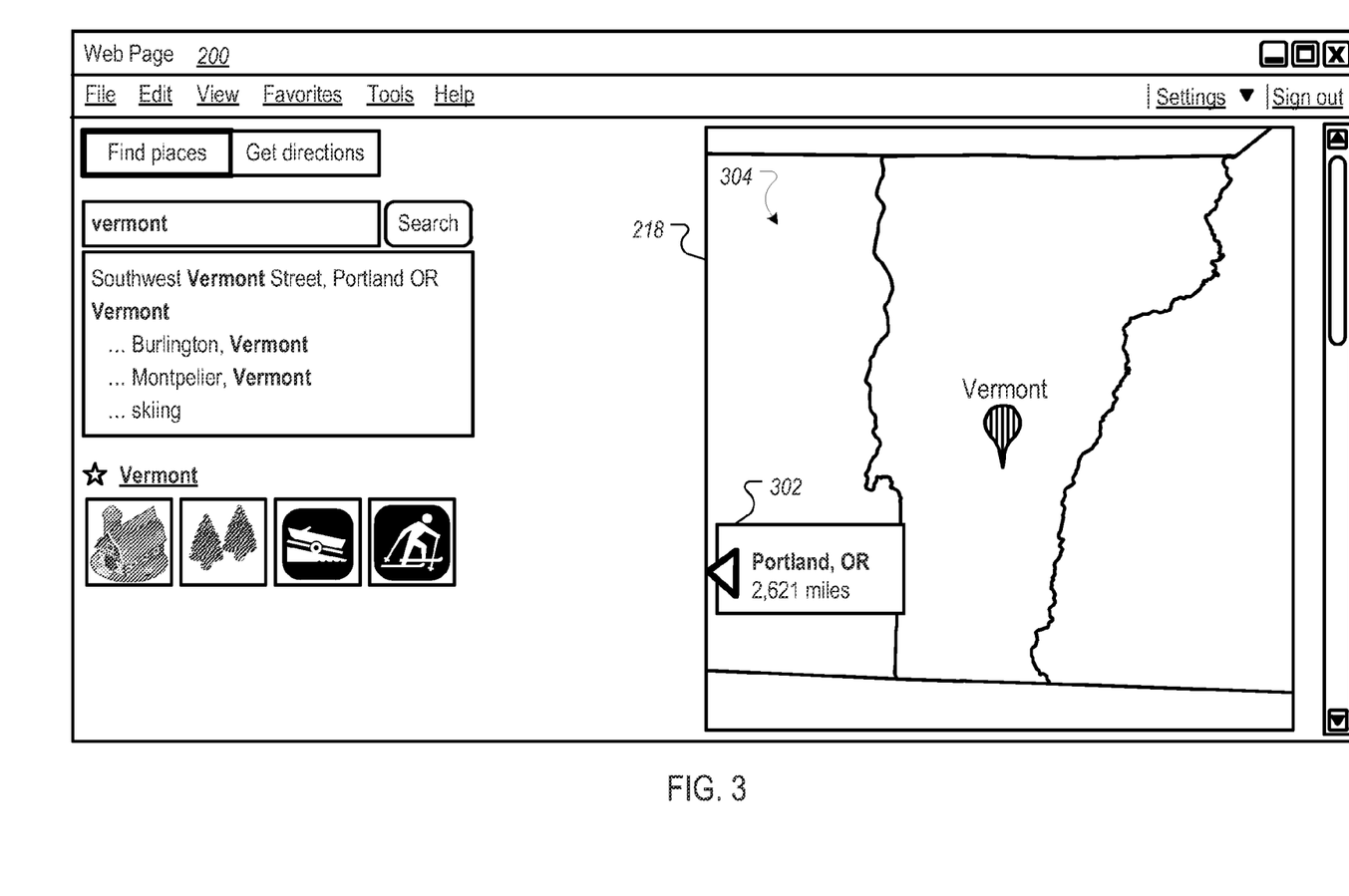
FIG. 3 is a screen shot of the user interface after selection of an indicator of off-screen content.

In some implementations, in response to a user selection (e.g., a mouse click) of the indicator 202, a second geographic area can be displayed on the user interface. For example, by clicking on the indicator 202 for Vermont, the displayed geographic area for Portland can be replaced by a display of the Vermont area, as shown in FIG. 3. In some implementations or situations, the display of the Vermont area can include an indicator corresponding to the Portland area (i.e., the previously displayed map area). In some implementations, the displayed geographic area for Portland can be replaced automatically by a display of the Vermont area, e.g., without the user explicitly clicking on the indicator 202 for Vermont. For example, selection of Vermont as the geographic area to display can occur automatically if Vermont is determined (e.g., by a wide probabilistic margin) to be the most likely location associated with the user's current input for the search query 208.

FIG. 3 is a screen shot of the user interface 200 after selection of an indicator 202 of off-screen content. In this example, the geographic area displayed on the map 304 can correspond to the geographic location of an indicator of another map, e.g., the Vermont entity associated with the indicator 202 on FIG. 2. The geographic area in this example can be determined based on identification of the entity represented by the selected indicator (e.g., Vermont) including, for example, address data, boundary data, and/or latitude/longitude coordinates associated with Vermont. In some implementations, the map 304 can be displayed after a first set of search results are provided in a browser or map application. Subsequently, upon a request received from the user (e.g., using a control), the map 204 with the indicator 202 can be displayed.

In some implementations, depending on the location and resolution of the geographic area displayed in the map 304, it is possible that other indicators can be displayed on the map 304. The indicators can, for example, include indicators displayed on the map 204 of FIG. 2 (e.g., corresponding to entities that are neither on the map 204 nor on the map 304) and indicators that are unique to the map 304. In some implementations, the map 304 can include an indicator 302 that indicates the direction and distance to Portland, i.e., the geographic area displayed on the map 204 before the user navigated to or was otherwise presented with the map 304. Additional indicators can also be presented, e.g., including indicators for each geographic area that has appeared in a map in the same user session. The user interface can also provide user controls through which the user can navigate to any specific one of a plurality of geographic areas respectively associated with a plurality of indicators, e.g., corresponding to entities responsive to previous searches. In some implementations, user controls can allow the user to toggle the visibility of indicators associated with any of their last several searches, e.g., by using a "Display Recent Searches" checkbox or other control (e.g., a control that allows individual indicators to be displayed, not displayed, or dismissed from the current map).

Figure 4:
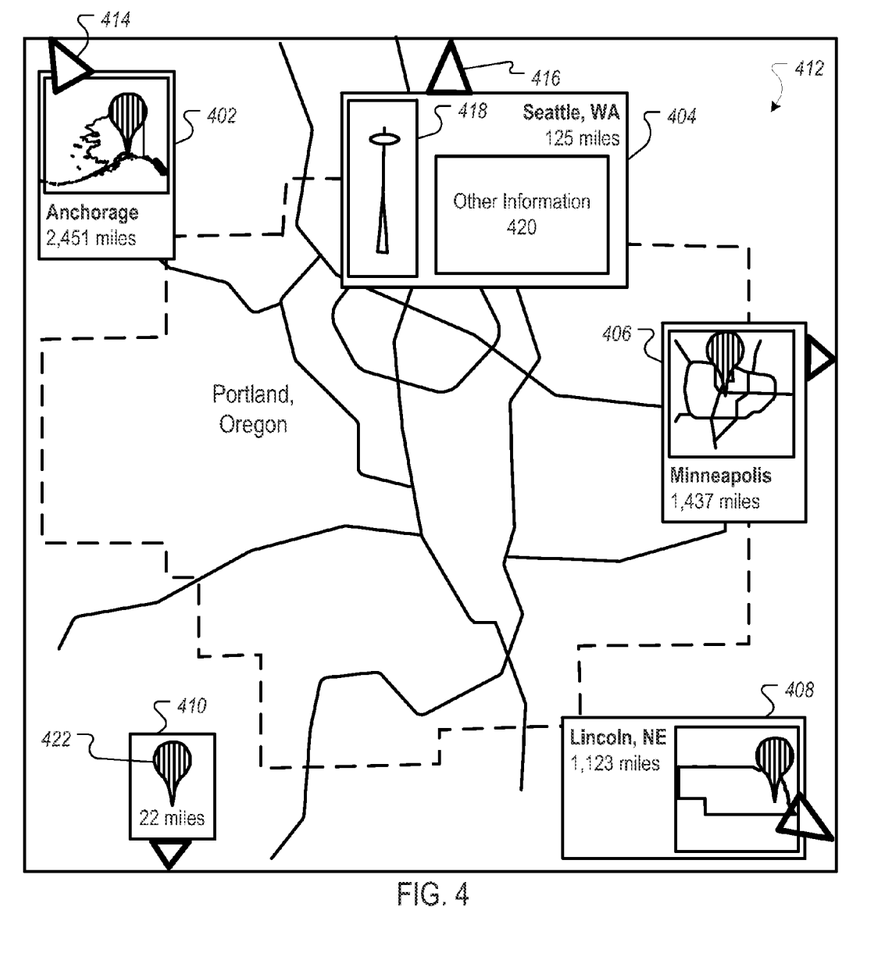
FIG. 4 shows various example indicators that can appear on an electronic map.

FIG. 4 shows various example indicators 402-410 that can appear on an electronic map 412. Each of the indicators 402-410 corresponds to a different geographic place, and each indicator indicates at least an approximate direction to the corresponding geographic place. For example, the "Anchorage" indicator 402 includes an arrow 414 that points to the northwest (e.g., toward Anchorage, Ak.) and provides a distance of 2,451 miles to Anchorage. In this example, the indicator appears in the upper-left-hand corner of the map 412 because that portion of the Portland, Oreg. is the part of the map 412 that is closest to Anchorage, Ak. Similarly, the Seattle indicator 404 appears along the top edge of the map 412, as this is the closest edge to Seattle, and an arrow 416 points primarily north, toward Seattle. The Seattle indicator 404, in this example, includes an image 418 (e.g., the Seattle Space Needle) and other information 420, which can include distance and time information as described above. The indicator 410, which in this example does not identify an entity or geographic location, includes a push-pin 422. In some implementations, the push-pin 422 can include a number or character that corresponds to a similarly-marked push-pin or listed item in the browser application or map application with which the map 412 can be displayed. In some implementations, indicators can include other elements such as user-clickable links, user-selectable videos, and user-selectable audio, to name a few examples. The example indicators 402-420 can be sized according to the information that is to be displayed. For example, the indicator 410 can be fairly small, as it includes only the push-pin 422 and a distance to the corresponding entity. However, the Seattle indicator 404, which includes the image 418 and other information 420, can be sized to accommodate the elements it contains.

In some implementations, indicators can include controls that allow a user to move or remove the indicators. For example, any of the indicators 402-410 can be moved using a drag and drop sequence performed by the user. In another example, the indicators 402-410 can include a "close" button or other control that the user can use, for example, to delete or remove the indicator. In some implementations, additional controls can exist by which the user can change the size of the indicators. The user can use any of these controls, for example, to reveal portions of the map 412 that are covered by one or more indicators 402-410. In some implementations, controls such as "hide all indicators" can be selected by the user to temporarily hide the controls (e.g., to view the entire map 412 without any indicators showing). A "show indicators" control can allow the user to re-display the indicators that have been hidden.

In some implementations, the indicators on a map at any one time can correspond to entities identified in response to one or more search queries. For example, each time a user enters a different search query, one or more indicators can appear on the map, including indicators corresponding to search results responsive to previously submitted search queries. In some implementations, displayed indicators can be eliminated automatically, e.g., based on time (e.g., more than five minutes on the user's screen) or number (e.g., keeping only the most recent ten indicators). In some implementations, the user can decide whether to display the indicators and/or to select which indicators to display. In some implementations, the user can dismiss individual indicators.

Figure 5:
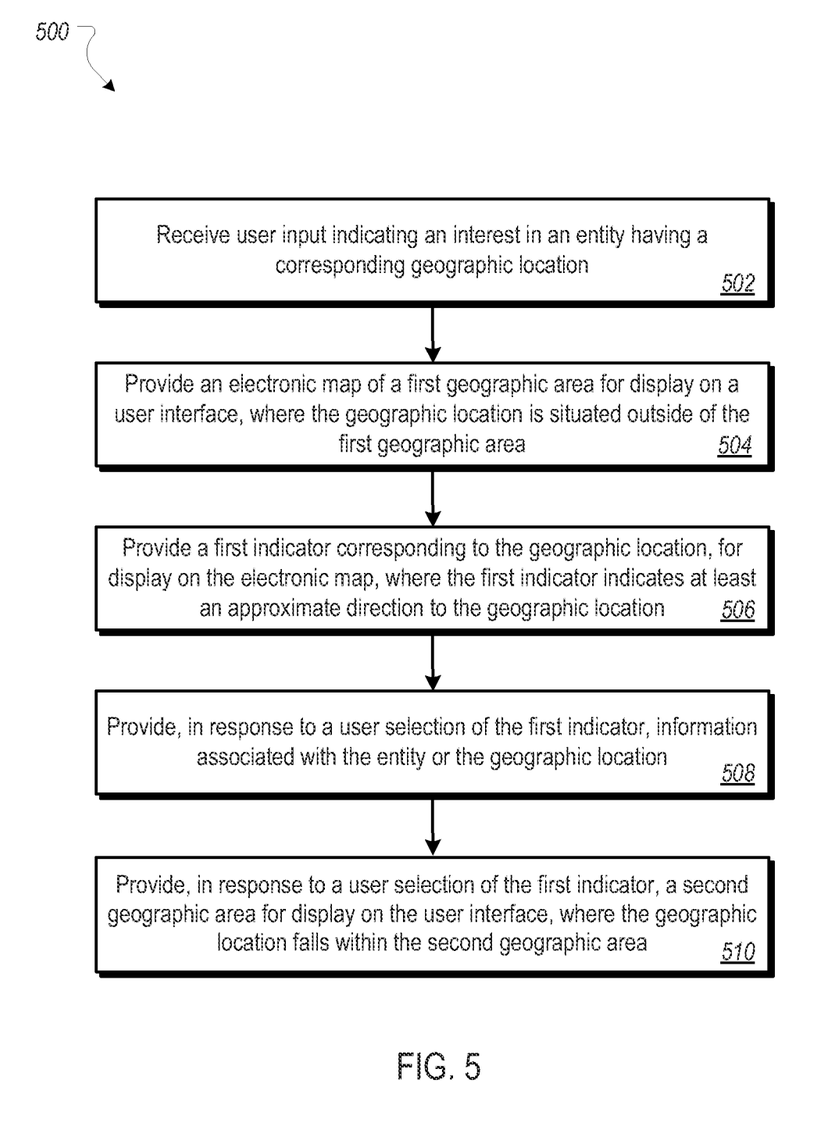
FIG. 5 is a flow chart of an example process for displaying electronic maps and indicators of off-screen content.

FIG. 5 is a flow chart of an example process 500 for displaying electronic maps and indicators of off-screen content. The process 500 can be performed, for example, by the map generator 120 and the indicator generator 122, using the geographic information 124. Multiple servers can perform the operations of the process 500. For example, the map generator 120 and the indicator generator 122 can be on the same server or different servers, and the geographic information 124 can be stored remotely from the map generator 120 and the indicator generator 122, e.g., distributed at several locations.

User input is received that indicates an interest in an entity having a corresponding geographic location (502). For example, referring to FIG. 2, a user can enter the search query 208 of "vermont" in the search field 210 of the user interface 200. Vermont can thus be identified as an entity of interest. Other example entities of interest include a business, an address, an attraction, a neighborhood, a campus, a town, a country, or some other geographic location. The location can cover a small geographic area (e.g., a single residence) or a larger geographic area (e.g., a city or a state).

An electronic map is provided for display on a user interface (504). The map (e.g., a road map view, a satellite view, a terrain view, etc.) is a map of a first geographic area. The electronic map may have been provided prior to receiving the user input. For example, the electronic map may correspond to search results responsive to a previously issued query, or to the user's current location as determined by GPS data, wifi access data, cell phone tower data, and other means. The geographic location of the entity identified in step 502 may be situated outside of the first geographic area and thus not contained on the map. For example, when the map 204 is provided for display on a user device, the entity "vermont" identified by the user is not included on the map 204.

A first indicator is provided for display on the electronic map (506). The first indicator corresponds to the geographic location and includes an indicator that indicates at least an approximate direction to the geographic location. For example, the indicator 202 can be part of the electronic map 204. The indicator can be an addition to (or overlay on) the electronic map. The indicator can explicitly indicate the approximate direction using a pointer (e.g., an arrow or other pointer) or can be located at or near an edge of the electronic map, along a line depicted by the center point of the geographic area depicted by the electronic map and the geographic location.

In some implementations, in response to a user selection (e.g., a mouse-over) of the first indicator on the display of the electronic map of the first geographic area, information associated with the entity or the geographic location associated with the first indicator is presented (508). For example, if the user causes the cursor to cross or hover over the indicator 202, information about Vermont or the area surrounding Vermont can be displayed. Other user actions can cause the information to be displayed, such as user selection of a control or some other action. Panning of or other changes to the geographic area displayed in the electronic map can cause a location of the first indicator on the display of the electronic map to change. For example, as the direction toward the entity associated with the first indicator changes, the first indicator can move on the display.

In some implementations, in response to a user selection (e.g., a mouse-click) of the first indicator displayed in the electronic map, the focus of the electronic map can be changed to a second geographic area that includes the geographic location corresponding to the first indicator. In some implementations, the user selection (e.g., the mouse-click) in this step can be different than the user selection (e.g., the mouse-over) in step 508. Thus, if the user clicks on the indicator 202 of FIG. 2, automatic navigation of the electronic map can occur so that the map displays the geographic area (e.g., Vermont) that is represented by the indicator 202. Specifically, the map 204 can be replaced with the map 304, as shown in FIG. 3. In this example, the Vermont entity has an associated geographic location that falls within the second geographic area (e.g., the geographic area shown in the map 304 that includes Vermont).

Figure 6:
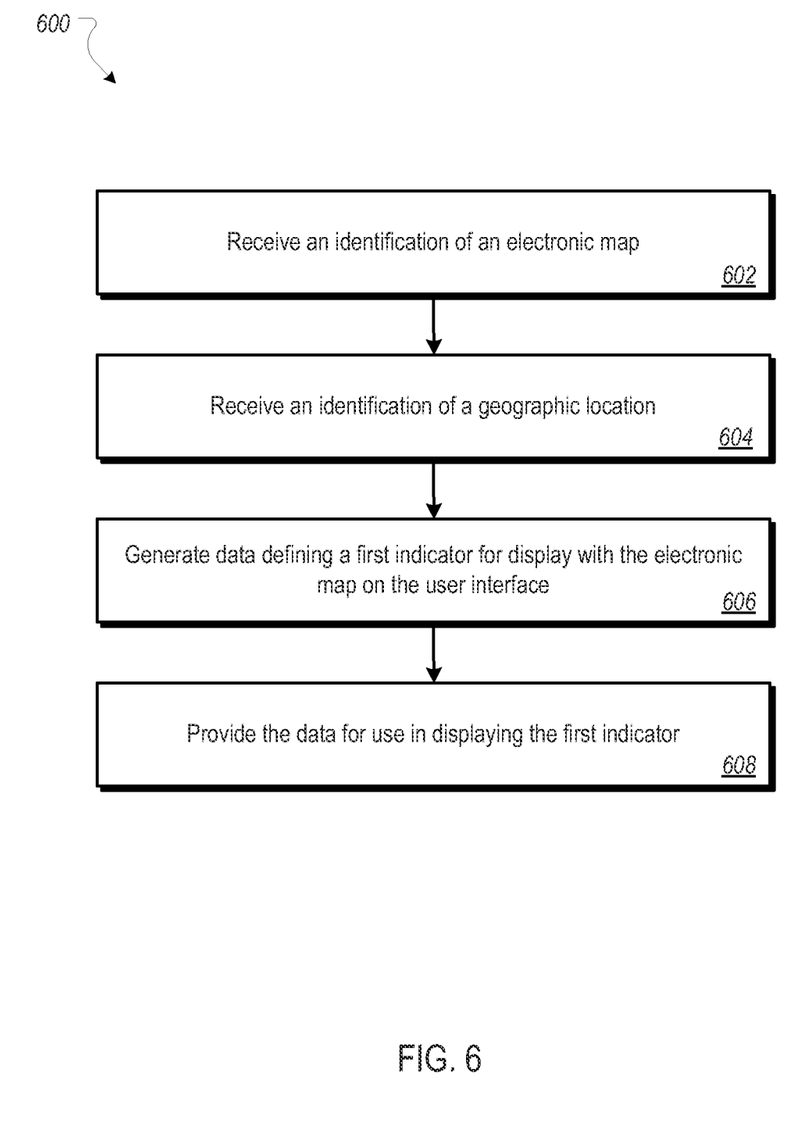
FIG. 6 is a flow chart of an example process for providing data for electronic maps and indicators of off-screen content.

FIG. 6 is a flow chart of an example process 600 for providing data for electronic maps and indicators of off-screen content. For example, the process 600 can be performed, at least in part, by the map generator 120 and the indicator generator 122. As is the case for the process 500, multiple servers (e.g., on one or more computers) can perform the operations of the process 600. For example, servers or groups of servers that generate indicators of off-screen entities can be different from the servers that perform a search for a place/entity, identify the location of the place/entity, identify the boundaries of the geographic area that is mapped, generate or retrieve the actual map, and/or send the map to the user device. In fact, each of the operations of the process 600 can be performed by different servers. On the other hand, the receiving operations can, for example, include receiving the data from another block of code within the same computer program or a different module within the same server. In some implementations, the one or more computers can include a server operable to interact with the device (e.g., the user device 106) through a data communication network (e.g., the network 102). For example, the user device 106 can interact with the server as a client.

An identification of an electronic map is received (602). For example, the map generator 120 can receive (e.g., from a map generation server) coordinates of an electronic map's center-point and size, coordinates of the map's corners, or some other identification. The identified electronic map can be an electronic map (e.g., the map 204 or the map 304) that is displayed or is to be displayed on a user interface, e.g., the user interface 200, and corresponds to a geographic area. In some implementations, identification of the electronic map is generated in response to a search query for a place located in the geographic area. For example, the map 204, containing the geographic area around Portland, can be identified based on a user query associated with Portland (e.g., an entity located in Portland). In some implementations, identification of the electronic map is generated in response to a request to pan an electronic map displaying a different geographic are to the geographic area. For example, the map 204 that is centered around Portland can be requested as the result of the user panning a map displaying an area adjacent to Portland in the direction of Portland.

An identification of a geographic location is received (604). For example, the geographic location can be coordinates (e.g., latitude/longitude coordinates) of an entity situated outside of the geographic area. In some implementations, identification of the geographic location can be generated in response to a search query for an entity corresponding to the geographic location. For example, the entity can be Vermont or some other place identified in a search query, e.g., by a user using a web search application or a map application. Further, Vermont can be outside of the geographic area (e.g., Portland) that is currently displayed on the electronic map (e.g., the map 204).

Data defining a first indicator corresponding to the off-map geographic location (e.g., Vermont) is generated for display with the electronic map on the user interface (606). For example, the indicator generator 122 can generate data for displaying the indicator 202 on or near the map 204. The data further identifies the position on the electronic map on which the indicator is to be displayed, and at least an approximate direction to the off-map geographic location. For example, the indicator generator 122 can identify a position along the edge of the map 204 for display of the indicator 202, and a direction to the geographic location of the off-map entity for which the indicator 202 is created. In some implementations, the first indicator includes at least one of a distance to the off-map geographic location or an estimated time to travel to the off-map geographic location. For example, the indicator generator 122 can generate information corresponding to the distance from the indicator 202 to the geographic location of the off-map entity (e.g., the distance to Vermont is "2,621 miles"). In another example, the indicator generator 122 can generate data to display information on the indicator 202 that the estimated driving time to Vermont is 52 hours.

The data is provided for use in displaying the first indicator of the off-map entity on the electronic map (608). For example, the indicator generator 122 can provide the data to the client 106 (for use on the interface 200) for displaying the indicator 202 on the map 204. The indicator 202 can be one of several indicators that indicator generator 122 provides, and each indicator can correspond to a different geographic location and corresponding entity or place. The operations of FIG. 6 can be performed, for example, at a server (e.g., map generator server 120) or at the client 106 (e.g., using a script that accompanies a web page provided to the client 106).

In some implementations, generating data defining a first indicator for display with the electronic map on the user interface includes receiving coordinates for the geographic location, receiving coordinates for a location within the geographic area currently displayed in the electronic map, and calculating an angle representing a direction of travel between the two locations. For example the indicator 122 can calculate an angle for a pointer (e.g., an arrow) on the indicator 202, where the angle represents the travel direction. Thus, the indicator 202 on the map 204 for Vermont can have an arrow or other pointer that points in the direction of Vermont. In some implementations, the angle can be calculated by a script that is executable on a client device. For example, the indicator generator 122 can provide the script to the user device 106, where the indicator generator 122, for example, can execute the script to determine a direction of travel or pointer angle for use with the indicator 202. In some implementations, the script can be adapted to dynamically calculate the direction of travel/pointer angle when a user pans or rotates the electronic map. For example, as the user pans the map 204 or otherwise changes the orientation, zoom level, or location of the map 204, the indicator 202, including its arrow, can change in real time, e.g., changing its pointing direction as needed to correctly point to the location of the off-screen entity.

In some implementations, an identification of a second geographic location situated outside of the geographic area currently displayed in the electronic map is received, and data is generated that defines a second indicator for display with the electronic map on the user interface. The second indicator indicates at least an approximate direction from the geographic area currently displayed in the electronic map to the second geographic location. The data is provided for use in displaying the second indicator on the electronic map. For example, the user can identify a second off-screen entity or place that is outside the geographic area of the currently-displayed map 204. The indicator generator 122 can generate a second indicator 202 for that second geographic location and provide data for the indicator 202 to the user device 106.

An electronic document, such as the electronic map 204 (which for brevity will simply be referred to as a document) may, but need not, correspond to a file. A document may be stored in a portion of a file that holds other documents, in a single file dedicated to the document in question, or in multiple coordinated files such as a plurality of adjacent map tiles.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
providing, by a processor to a user device, an electronic map of a first geographic area that includes a first entity at a first geographic location for display on a user interface of the user device;
receiving, by the processor from the user device, user input indicating an interest in a second entity at a second geographic location that is outside of the first geographic area; and
in response to receiving user input indicating an interest in a second entity, providing, by the processor to the user device, a first indicator comprising a map of the second geographic area for display as an overlay on the map of a first geographic area in a position that indicates at least an approximate direction to the second geographic location.

2. The method of claim 1 wherein the first indicator includes at least one of a distance between the first and second geographic location or an estimated time to travel to the second geographic location from the first geographic location.

3. The method of claim 1 wherein a characteristic of the first indicator depends on a distance to the first geographic location.

4. The method of claim 1 further comprising:
providing, in response to a user selection of the first indicator, information associated with the second entity or the second geographic location.

5. The method of claim 1 wherein the user input indicating an interest in a second entity comprises a first search query.

6. The method of claim 1, further comprising providing, in response to a user selection of the first indicator, a map of the second geographic area for display on the user interface.

7. The method of claim 6, further comprising generating a second indicator representing the first entity or the first geographic location, and displaying the second indicator in the map displaying the second geographic area.

8. The method of claim 1 wherein the user input includes a search query and the second entity is identified as being responsive to the search query.

9. The method of claim 1 further comprising providing a second indicator, corresponding to the second entity, for display on the electronic map of the second geographic area to indicate an approximate location of the second entity in the second geographic area.

10. The method of claim 1 wherein the electronic map is displayed in a viewport window of a web browser.

11. The method of claim 1, wherein the first indicator comprises an interactive element that is configured to display information associated with the second entity in response to user interaction with the first indicator.

12. A non-transitory computer readable storage medium encoded with a computer program, the program comprising instructions that when executed by data processing apparatus cause the data processing apparatus to perform operations including:
providing a first electronic map of a first geographic area to be displayed on a user interface, wherein the first geographic area includes a first entity at a first geographic location;
receiving an identification of a second geographic location situated outside of the first geographic area; and
in response to receiving an identification of a second geographic location situated outside of the first geographic area:
providing a second electronic map of a second geographic area for display on the user interface, wherein the second geographic area includes the second geographic location; and
generating data defining a first indicator for display as on overlay on the second electronic map on the user interface, wherein the first indicator indicates at least an approximate direction to the first geographic area from the second geographic area, a distance between the first and second geographic locations, and an estimated time to travel to the first geographic location from second geographic location.

13. The computer storage medium of claim 12 wherein the identification of the second geographic location is generated in response to a search query for an entity located at the second geographic location.

14. The computer storage medium of claim 13 wherein the first electronic map is generated in response to a search query for a place located in the first geographic area.

15. The computer storage medium of claim 13 wherein the first electronic map is generated in response to a request to pan to the first geographic area from a different geographic area.

16. The computer storage medium of claim 12 wherein the instructions, when executed by data processing apparatus, cause the data processing apparatus to perform further operations including:
receiving an identification of a third geographic location situated outside of the first and second geographic areas;
providing a third electronic map of a third geographic area to be displayed on the user interface, wherein the third geographic area includes the second geographic location;
generating data defining a second indicator for display as on overlay on the third electronic map on the user interface, wherein the second indicator indicates at least an approximate direction to the first geographic area from the third geographic area; and
generating data defining a third indicator for display as on overlay on the third electronic map on the user interface, wherein the third indicator indicates at least an approximate direction, from the third geographic area, to the second geographic area.

17. The computer storage medium of claim 12 wherein generating data defining a first indicator for display with the electronic map on the user interface includes:
receiving coordinates for a location within the first geographic area;
receiving coordinates for a location within the second geographic area; and
calculating an angle between the coordinates for the location within the first geographic area and the coordinates for the location within the second geographic area.

18. The computer storage medium of claim 12 wherein generating data defining a first indicator for display with the second electronic map on the user interface includes:
providing a script executable on a client device that displays the user interface, wherein the script calculates an angle between coordinates for a location within the first geographic area and coordinates for a location within the second geographic area.

19. The computer storage medium of claim 18 wherein the script is adapted to dynamically calculate the angle based on at least one of a current orientation of the electronic map or panning of the electronic map.

20. A system comprising one or more computers operable to interact with a user device in order to:
generate an electronic map of a first geographic area in response to receiving a first search query via the user device, wherein a search result responsive to the first search query corresponds to a first entity located in the first geographic area;
provide the electronic map of the first geographic area to the user device for display;
generate an electronic map of a second geographic area in response to receiving a second search query via the user device after providing the electronic map of the first geographic area, wherein a search result responsive to the second search query corresponds to a second entity located in the second geographic area;
generate data defining an indicator for display on the electronic map of the second geographic area, wherein the indicator corresponds to the first geographic location and indicates at least an approximate direction to the first geographic location; and
provide the electronic map of the second geographic area and the data defining the indicator to the user device for display.

21. The system of claim 20 wherein the data defining the indicator defines an appearance of a graphical component including a pointer in the direction to the first geographic location.

22. The system of claim 20 wherein the data defining the indicator defines instructions executable on the user device to calculate the direction based on at least one of a currently displayed geographic area or a current orientation of the electronic map.

23. The system of claim 20, wherein the one or more computers include a server operable to interact with the device through a data communication network, and the device is operable to interact with the server as a client.

* * * * *